Figure 1:
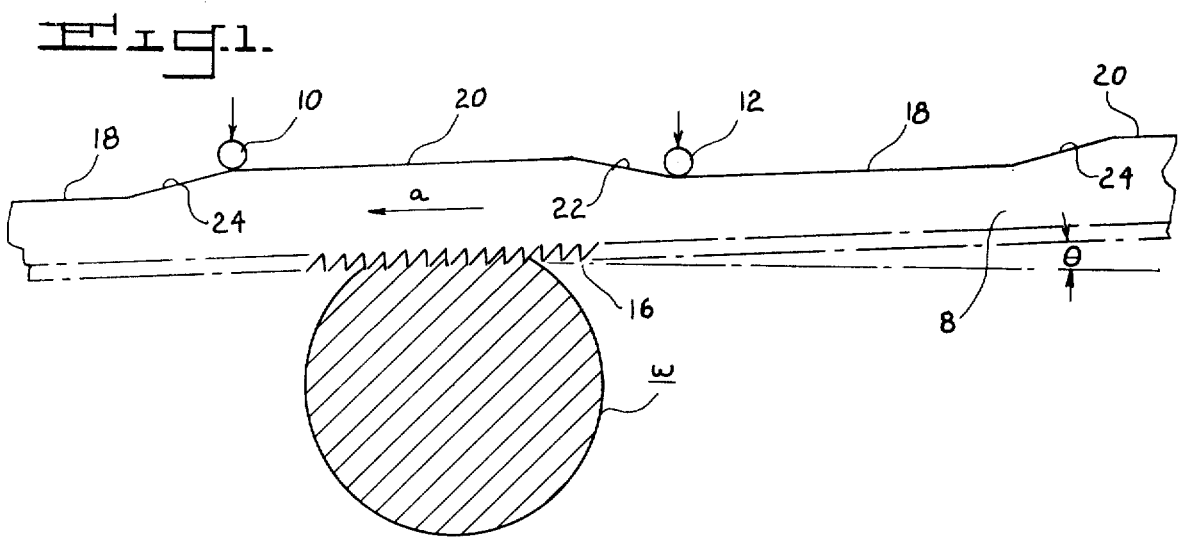

United States Patent [19]
Howard

[11] 4,423,653
[45] Jan. 3, 1984

[54] BAND SAW BLADE CONSTRUCTION

[75] Inventor: L. Brewster Howard, West Springfield, Mass.

[73] Assignee: American Saw & Mfg. Company, East Longmeadow, Mass.

[21] Appl. No.: 434,712

[22] Filed: Oct. 15, 1982

[51] Int. Cl.³ .................... B23D 61/12; B27B 33/06
[52] U.S. Cl. .................................. 83/820; 83/661; 83/835
[58] Field of Search ............... 83/661, 820, 835, 847; 30/355; 76/112

[56] References Cited

U.S. PATENT DOCUMENTS

| | | | |
|---|---|---|---|
| 1,850,478 | 3/1932 | Schaefer | 83/847 |
| 4,160,397 | 7/1979 | Bertini | 83/661 X |
| 4,195,543 | 4/1980 | Tapply | 83/661 X |
| 4,205,571 | 6/1980 | Bertini | 83/661 |

FOREIGN PATENT DOCUMENTS 2748822 5/1978 Fed. Rep. of Germany ........ 83/661

Primary Examiner—James M. Meister
Attorney, Agent, or Firm—Chapin, Neal & Dempsey

[57] ABSTRACT

Band saw blades embodying this invention are especially adapted for the cutting of hard metal work pieces of large cross-sectional size. The blades are characterized by a straight, planar sawtooth cutting edge and a tiered or stepped back edge, having alternate recessed and outer edge portions. Both the recessed and outer edge portions of the blade's back edge are generally parallel to the cutting edge of the blade and adjacent of these alternate edge portions are connected with inclined or tapered sections. The length of the recessed and outer edge portions are approximately equal; and when combined with the length of an inclined section, is about equal to the spacing of the saw guides of the band saw machine in which the blade is to be used.

5 Claims, 5 Drawing Figures

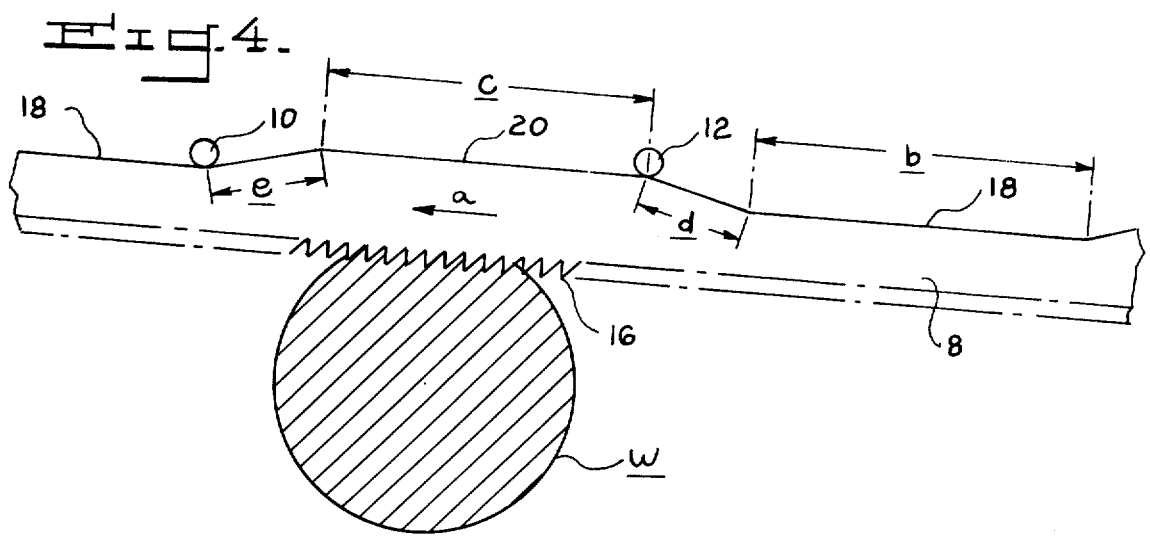
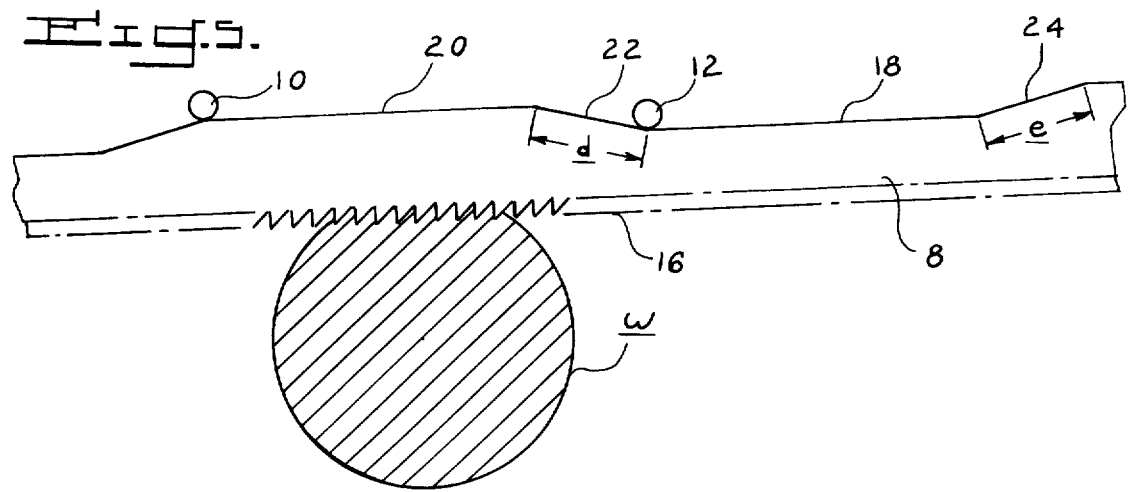

BAND SAW BLADE CONSTRUCTION

BACKGROUND OF THE INVENTION

This invention relates to band saw blades and, particularly, to saw blades having an irregular configuration which are especially adapted for use in large band saw machines for cutting very hard metal work pieces of large cross-sectional size. In commercial band saws, an endless saw blade is looped about a pair of wheels by which it is driven, and approximately midway between the wheels of the band saw, a pair of pressure guides are located, which are spaced apart a distance greater than the cross-sectional size of work pieces to be cut by the machine. These guides apply pressure to the back edge of the blade as the sawtooth edge cuts through the work. In most of the commercially available band saws, the cutting edge of the blade and the back edge are parallel and follow straight lines. As the teeth of the blade cut through the work piece, all teeth in contact with the work have an equal, albeit, minimum force applied thereto. This causes the blade to bow outwardly from the work and there is a tendency for each tooth not to cut a full chip. Cutting efficiency of such blades is, thus, relatively slow, particularly when cutting very hard metal work pieces and blade life is quite short.

In the Tapley U.S. Pat. No. 4,195,543 granted on April 1, 1980, a band saw blade is disclosed which has an overall sinusoidal pattern, that is, both the cutting and back edge of the blade follow a wavy pattern. The Tapley patent refers as background to a number of prior patents which also disclose blades having undulating configurations. These include U.S. Pat. No. 286,706 to Kay; U.S. Pat. No. 817,361 to Brown; U.S. Pat. No. 1,850,478 to Schaefer 1932 which show continuous band saws for use in cutting soft materials such as meat. Canadian Pat. No. 883,602 to Amada 1971, is also referred to in Tapley as disclosing a sinusoidal band saw, having convexly curved hard portions and concavely curved soft portions. In Amada, the wave length of their blade pattern is made approximately one inch. Tapley distinguishes configuration of his blade from those of the above-mentioned prior art by characterizing the prior art blades as having varying wave lengths adapted for cutting soft material, while Tapley's blade has a longer wave length adapted for cutting hard material.

There are a number of other patents in the prior art wherein the sawtooth edge of the blade is straight and the back edge of the blade is progressively tapered relative to the cutting edge. These include: German Patent No. DT2,748,822 dated Mar. 5, 1978, which shows a band saw having progressively tapered sections with cam step from the portion of the blade of maximum thickness to the next adjacent section of minimum thickness. U.S. Pat. No. 4,160,397 dated July 10, 1979 to Bertini discloses a saw blade in which the back edge includes oppositely inclined portions which taper in opposite directions from an intermediate point on the blade. The inclined edges are sloped to diverge outwardly relative to the cutting edge of the blade from one intermediate point. U.S. Pat. No. 4,205,571 dated June 3, 1980 to Bertini discloses a band saw blade in which the rear edge is progressively inclined relative to the cutting edge and the minimum and maximum transverse sections of the blade are contiguous and define a cam step between the inclined sections of the back edge of the blade.

It is the principal object of this invention to provide an improved band saw blade, having improved cutting speed and longer wear and is particularly advantageous for use in cutting large metal work pieces.

It is another object of this invention to provide an improved band saw blade of the above type, which is relatively more economical to manufacture since about fifty percent of the back edge of the blade need not be modified from that of a conventional band saw blade.

It is also an object of this invention to provide a band saw blade of the above type for use in band saw machines having pressure guides spaced apart on opposite sides of the work wherein the guides cooperate with the patterned back edge of the blade to effect a variable cutting action whereby the blade cuts the work alternately at one angle and then at a substantially different angle.

The above and other objects and advantages of this invention will be more readily apparent from the following description and with reference to the following drawings, in which:

FIGS. 1-5 are elevational views of a schematic nature showing a bandsaw blade of a type embodying this invention, illustrating its variable cutting action.

Referring, in detail, to the drawings in FIG. 1 is shown a band saw blade 8 of the type embodying this invention. The blade is shown cutting a work piece w which has its longitudinal axis disposed transversely of the cutting plane of the blade. The blade is an endless band looped about a pair of rolls and is driven thereby. In the drawings, the blade is shown moving from right to left as illustrated by the arrow a.

A pair of saw guides are illustrated at 10 and 12, which are spaced apart a distance greater than the cross-sectional size of the work which the band saw machine is adapted to cut. These guides are pressed against the back edge 14 of the blade by any suitable means and in this way, the blade is continuously urged against the work w.

Blade 8, embodying this invention, comprises a straight cutting edge 16 and a patterned back edge 14. The cutting edge of the blade 8 may be of conventional toothed construction wherein the teeth lie along a straight line. The back edge 14 of the blade is of stepped or tiered construction and includes recessed edge portions 18 and outer edge portions 20, which are not recessed. The outer edge portions 20 are preferably the unmodified back edge of a conventional band saw blade in which the cutting edge and back edge of the blade are straight and parallel. To fabricate a blade of the type embodying this invention, it is only necessary to machine the recessed portions 18 of the back edge of a conventional band. This is more economical than fabricating a band saw wherein the entire back edge of the blade is progressively tapered over the length of the blade.

The blade 8 includes tapered or inclined back edge portions 22 and 24, which extend from the outer edge portions 20 to the recessed edge portions 18. Preferably, the major portion of the back edge 14 is composed of the recessed straight edges 18 and the outer straight edges 20, which are both parallel to the cutting edge of the blade. The inclined edge portions 22 and 24 are only a minor portion of the length of the blade and serve as a smooth transition for the saw blade guides 10 and 12 as the blades moves thereagainst. In one specimen of blade embodying this invention, as illustrated in FIG. 4, the length b of each recessed edge was made 9 inches and the length c of the outer edge 20 also 9 inches. The leading inclined edge 22 was about 3 inches, as shown at d in FIG. 5; and the trailing inclined edge 24, as illustrated at e in FIG. 5, was also about 3 inches. The depth of the recessed portions was about 0.045 inch, although this could vary from 0.010 inch to 0.125 inch. It will be recognized that the lengths of the parallel edge portions are many times greater than the lengths of the inclined edge portions. In addition, the length of the outer edge portion c plus the inclined section e equals the length of recessed section b plus inclined edge d. Preferably, therefore, in a blade embodying this invention:

c+e=b+d

In addition, the saw guide spacing, i.e., the distance between the guides 10 and 12 is, preferably, equal to the length of one of the parallel edges plus the length of a tapered edge. In the embodiment described above, the saw guide spacing was 12 inches, the parallel edges 9 inches, and each inclined edge 3 inches.

Figure 2:
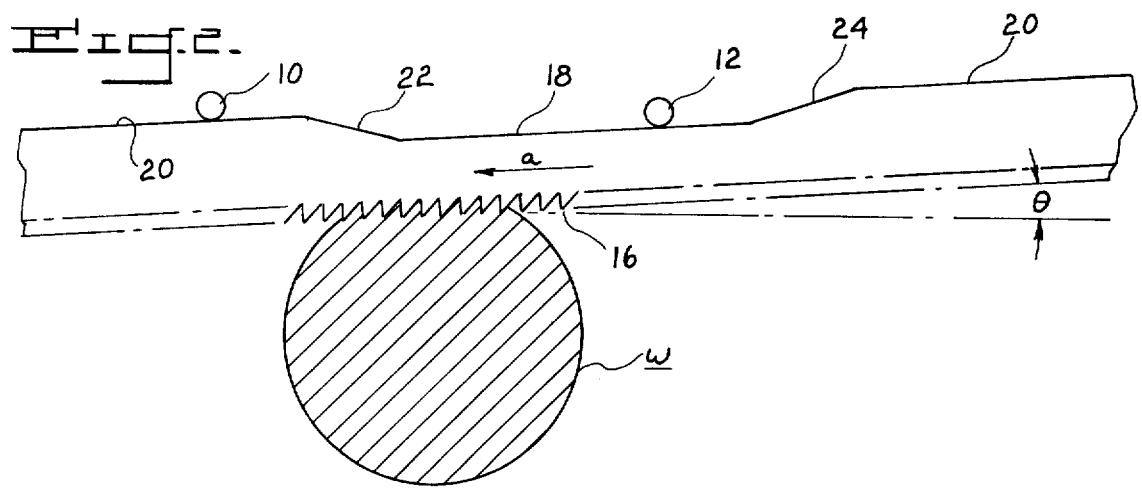
Figure 3:
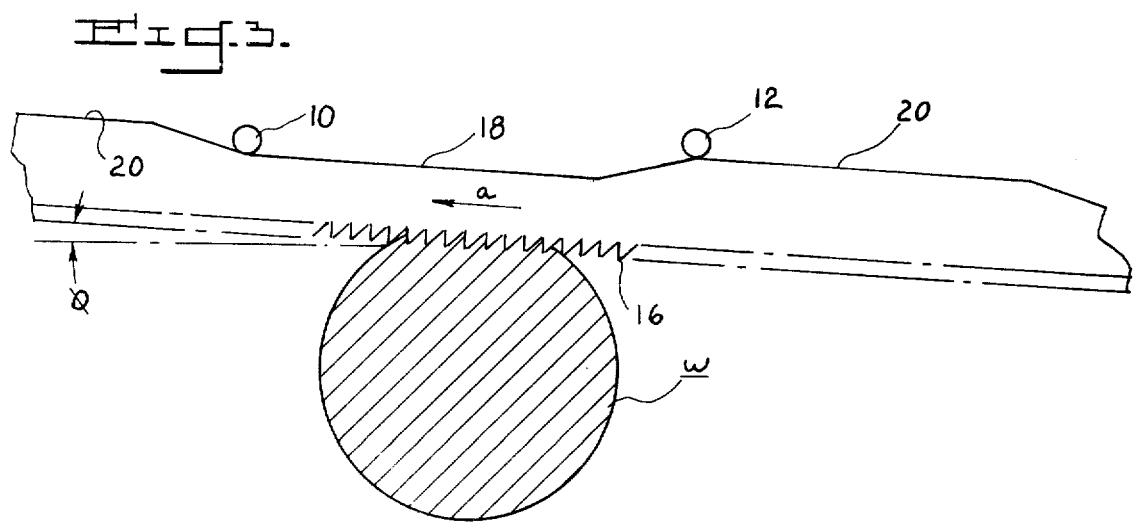

Referring now in sequence to FIGS. 1-5, it will be noted in FIG. 1 that saw guide 10 is shown positioned against the leading end of edge 20 and guide 12 is correspondingly located at the beginning of edge 18, the blade 8 moving from right to left in the drawing. Since the guides urge the blade against the work w, the blade will be tilted relative to the horizontal to angle $\theta$. In FIG. 2, the blade continues to move with the guides, urging the blade 8 at the same cutting angle. This cutting angle will be held for approximately the next 9 inches of blade travel. In FIG. 3, the blade has advanced until guide 10 is now against the recessed edge 18, while guide 12 is against the outer edge 20 of the blade. As illustrated in FIG. 3, the blade angle, relative to the horizontal, has now shifted as illustrated at $\phi$ in FIG. 3. It will be recognized that in FIG. 1 for angle $\theta$, the blade centerline is above the horizontal plane while in FIG. 3, it has shifted below the horizontal to define the angle $\phi$.

In FIG. 4, the blade has moved over the next 9 inches of blade travel and in FIG. 5, the blade cutting angle has shifted back to the same cutting angle as illustrated in FIG. 1.

It will be realized that one saw guide is, riding on one parallel surface 18 or 20 at the same time the other guide is riding on the other of these two parallel surfaces. With this blade arrangement, the blade alternately cuts at two different angles relative to the work piece. In this way, the number of teeth of the blade in contact with the work at any one time is reduced whereby the pressure exerted by each tooth is increased and each tooth, therefore, takes a better cut than is the case where the saw is maintained at the same cutting angle as it advances through the work piece.

To evaluate the cutting action a blade embodying this invention was used to cut a 304 stainless steel 4" diameter bar. The band saw was operated at a band speed of 120 SFM. Thirty-five cuts were made. The 6th cut took an elapsed time of 3.10 min. and the 35th cut 4.05 min. An average cutting time of 3.66 min. was achieved.

The identical work piece was cut with an equivalent saw blade but having a progressively tapered back edge, as described in U.S. Pat. No. 4,160,397. The same machine speed and all other parameters of the test described above were duplicated. In this test, the best cutting time achieved was 3.97 min. and the 35th cut took 6.27 min. An average cutting speed for the thirty-five cuts was 5.38 min. This represents approximately a 32% improvement in average cutting speed of a blade embodying this invention as compared with a band saw blade in which the back edge is progressively inclined in opposite directions relative to the cutting edge. A blade embodying this invention was also compared with a conventional bandsaw of the identical metal and tooth design and was found to have approximately a 180% improvement in cutting speed for an identical work piece.

In addition, to its outstanding performance, the blade embodying this invention is easier and more economical to manufacture since only about one half of its back edge is machined to provide recessed portions, the remainder of the blade's back edge being that of a conventional saw blade.

Having, thus, disclosed this invention, what is claimed is:

1. Bandsaw blade having a toothed cutting edge for use in band saw machines having a pair of spaced saw blade guides engaged with the back edge of the blade to urge the cutting edge of the blade against the work piece for cutting the same, said blade comprising a planar cutting edge and a tiered back edge, the back edge including a plurality of alternate recessed edge portions and outer edge portions, both said recessed and outer edge portions of said blade being generally parallel to said cutting edge whereby the cutting of said blade alternately changes from one angle to another substantially different angle.

2. Band saw blade as set forth in claim 1 wherein said recessed and outer edge portions of the blade are approximately of equal length.

3. Band saw blade as set forth in claim 2 wherein said recessed and outer edge portions of the blade are interconnected by obliquely inclined, shorter edge sections.

4. Band saw blade as set forth in claim 3 in which the total length of one of said inclined edge sections plus the length of one of said parallel sections is approximately equal to the spacing between said saw guides.

5. Band saw blade having a planar toothed cutting edge for use on band saw machines having a pair of spaced saw blade guides engaged at spaced locations along the back edge of the blade to urge the cutting edge against a work piece for cutting the same, said blade including a plurality of recessed and outer edge portions alternately arranged along the back edge of the blade, said portions being interconnected by relatively short inclined sections, said recessed and outer edge portions being generally parallel to said cutting edge having a length related to the saw guide spacing such that one guide is alternately engaged with an outer edge portion and then a recessed edge portion as the blade is advanced thereby while simultaneously the other saw guide is alternately engaged with a recessed portion, and then an outer edge portion whereby the blade is advanced thereby, while simultaneously the tially different cutting angle relative to a work piece disposed at a point intermediate the said saw guides.

* * * * *